United States Patent
Philip et al.

(10) Patent No.: US 12,488,163 B1
(45) Date of Patent: Dec. 2, 2025

(54) IN-SITU FUNCTION PARAMETER SEARCH SPACE FILTERING FOR MACHINE LEARNING IN ELECTRONIC DESIGN AUTOMATION

(71) Applicant: Synopsys, Inc., Mountain View, CA (US)

(72) Inventors: Mathew V. Philip, Santa Clara, CA (US); Joseph R. Walston, Durham, NC (US)

(73) Assignee: SYNOPSYS, INC., Sunnyvale, CA (US)

(*) Notice: Subject to any disclaimer, the term of this patent is extended or adjusted under 35 U.S.C. 154(b) by 682 days.

(21) Appl. No.: 17/846,946

(22) Filed: Jun. 22, 2022

Related U.S. Application Data (60) Provisional application No. 63/214,182, filed on Jun. 23, 2021.

(51) Int. Cl.
  *G06F 30/27* (2020.01)
  *G06F 30/398* (2020.01)
  *G06F 111/04* (2020.01)

(52) U.S. Cl.
  CPC .......... *G06F 30/27* (2020.01); *G06F 30/398* (2020.01); *G06F 2111/04* (2020.01)

(58) Field of Classification Search
  CPC ..... G06F 30/27; G06F 30/398; G06F 2111/04
  See application file for complete search history.

(56) References Cited

U.S. PATENT DOCUMENTS

| | | | |
|---|---|---|---|
| 11,423,303 B1* | 8/2022 | Jiao | H03G 5/165 |
| 12,032,464 B2* | 7/2024 | Golovin | G06F 11/3409 |
| 2019/0147369 A1* | 5/2019 | Gupta | G06N 3/126 |
| | | | 706/12 |
| 2022/0108215 A1* | 4/2022 | Choromanski | G06F 17/11 |
| 2022/0180241 A1* | 6/2022 | Song | G06N 20/00 |
| 2022/0198277 A1* | 6/2022 | Nia | G06N 3/047 |
| 2022/0405531 A1* | 12/2022 | Stanton | G06N 20/20 |
| 2023/0153512 A1* | 5/2023 | Shapira | G06F 30/398 |
| | | | 716/112 |
| 2025/0123943 A1* | 4/2025 | Oh | G06F 11/3409 |
| 2025/0124570 A1* | 4/2025 | Sirbulescu | G06T 7/0012 |

* cited by examiner

*Primary Examiner* — Nha T Nguyen
(74) *Attorney, Agent, or Firm* — Laxman Sahasrabuddhe; Park, Vaughan, Fleming & Dowler LLP (57) ABSTRACT

A set of parameter values may be generated by a machine learning (ML) model, where the set of parameter values may be used by a black-box function to generate a set of outputs based on a set of inputs. It may be determined whether the set of parameter values is expected to cause the set of outputs generated by the black-box function to violate one or more desired goals. If so, a first response may be provided to the ML model that discourages the ML model from generating sets of parameter values that are similar to the set of parameter values. Otherwise, the set of parameter values may be provided to the black-box function, a second response may be determined based on the set of outputs generated by the black-box function, and the second response may be provided to the ML model.

19 Claims, 6 Drawing Sheets

Surrogate model 402

```
ml_model_area = calculate_circuit_area(BBOX Input Data)
if (ml_model_area > user_area_goal) {
  signal_failed_smodel();
}
```

FIG. 4

Interposer
502

504  Foreach smodel {
       evaluate(smodel)
     }
506  If no smodel failure:
       Pass_proposal_to_bbox_function()
508  If smodel failure:
       Terminate_and_generate_bad_measure()

FIG. 5

Bad measure generator
602

```
Function terminate_and_generate_bad_measure(user_goals[]) {
  foreach goal user_goals {
    if goal is not harvested:                        604
        final_goal = goal * N
    else:                                            606
        final_goal = harvest_goal
  }
  Terminate_run();
  return final_goal[];
}
```

IN-SITU FUNCTION PARAMETER SEARCH SPACE FILTERING FOR MACHINE LEARNING IN ELECTRONIC DESIGN AUTOMATION

RELATED APPLICATION

This application claims the benefit of U.S. Provisional Application Ser. No. 63/214,182, filed on 23 Jun. 2021, the contents of which are herein incorporated by reference in their entirety for all purposes.

TECHNICAL FIELD

The present disclosure generally relates to an electronic design automation (EDA) system. More specifically, the present disclosure relates to in-situ function parameter search space filtering for machine learning (ML) in an EDA system.

BACKGROUND

The term "black-box function" or "black-box process" may refer to a function or process that receives a set of parameter values that drive the black-box function or process. The terms "black-box function" and "black-box process" are used interchangeably in this disclosure. For a given set of parameter values, the black-box function may receive a set of input values and generate a set of output values.

SUMMARY

Embodiments described herein may feature in-situ function parameter search space filtering for ML in EDA. A set of parameter values may be generated by an ML model, where the set of parameter values are used by a black-box function to generate a set of outputs based on a set of inputs. It may be determined whether the set of parameter values is expected to cause the set of outputs generated by the black-box function to violate one or more desired goals. If it is determined that the set of parameter values is expected to cause the set of outputs generated by the black-box function to violate the one or more desired goals, a first response may be provided to the ML model that discourages the ML model from generating sets of parameter values that are similar to the set of parameter values. On the other hand, if it is determined that the set of parameter values is not expected to cause the set of outputs generated by the black-box function to violate the one or more desired goals, (1) the set of parameter values may be provided to the black-box function, (2) a second response may be determined based on the set of outputs generated by the black-box function, and (3) the second response may be provided to the ML model.

In some embodiments described herein, the first response to the ML model that discourages the ML model from generating the sets of parameter values that are similar to the set of parameter values may include multiplying a desired goal in the one or more desired goals by a constant.

In some embodiments described herein, the set of inputs may include a first circuit design. The black-box function may be an EDA tool that generates a second circuit design based on the first circuit design by using the set of parameters. In some embodiments described herein, determining whether the set of parameter values is expected to cause the set of outputs generated by the black-box function to violate the one or more desired goals may include evaluating one or more surrogate models based on the first circuit design and the one or more desired goals. In some embodiments, a surrogate model in the one or more surrogate models may determine if the first circuit design violates a foundry design rule. In some embodiments described herein, a surrogate model in the one or more surrogate models may determine if the first circuit design satisfies a set of assertions. In some embodiments described herein, the one or more desired goals may include a goal that ensures that an area of the first circuit design is less than or equal to an area threshold. In some embodiments described herein, the one or more desired goals may include a goal that ensures that a power consumption of the first circuit design is less than or equal to a power consumption threshold.

BRIEF DESCRIPTION OF THE FIGURES

The disclosure can be understood based on the detailed description given below and the accompanying figures. The figures, examples and embodiments are for illustrative purposes, and do not limit the scope of the disclosure. Furthermore, the figures are not necessarily drawn to scale.

DETAILED DESCRIPTION

In the electronic design automation (EDA) space, a black-box function may be a software tool package that performs circuit optimization for power and area. The EDA optimization tool may take in a representation of a circuit and coupled with a set of parameters, perform a set of computations that may change the representation of the circuit to improve one or more metrics of the circuit. The output of the EDA optimization tool may be a set of values that measure salient attributes of the circuit such as power, area, and timing.

A parameter in the set of parameters may be a tool control option, which may include, but is not limited to, a computational effort, and a design setting (e.g., the area of a transistor used in the circuit). A parameter may have a numerical value, or a value selected from a set of enumerated values (e.g., true/false). The range of values for a parameter may be expressed as a numerical range (e.g., from 0 to 10) or as a set of discrete values (e.g., low, medium, high). The set of parameters may be used to select different black-box function versions, different circuit designs, or may modify the computational process used by the black-box function.

A change in a parameter value may have a disproportionate effect on the result of the black-box function's computation. For example, a large change in a parameter value may not change the output or may cause a negligible change in the output. On the other hand, a small change in the parameter value may cause a large and non-linear change in the output (e.g., for complex non-linear/nonconvex EDA optimization tools, a small change in a parameter, e.g., the value changing from 1→2, may elicit large change in the output). It may be difficult or impractical for a user to improve the output results by manually selecting the set of parameter values because the effect of changing a parameter value on the output may be difficult to understand and/or predict.

The output generated by a black-box function may be sampled and judged for "fitness" with respect to a set of desired values. The fitness of the set of output values returned by the black-box function may refer to how much better or worse the output values are with respect to the corresponding desired values. The parameters to the black-box function may be desired to be tuned and optimized so that the set of outputs generated by the black-box function improve, i.e., the "fitness" score of the output increases.

The tuning of the parameters may be performed using an iterative process that uses heuristics and/or trial and error. However, such techniques may fail to improve the fitness score for complex black-box functions for which the relationship between the inputs and the outputs may be highly nonlinear, nonconvex, and noisy. Additionally, the parameter search space may be extremely large, e.g., the system may include thousands of parameters, with each parameter having a large range of possible values.

The black-box process may also be computationally expensive and/or time consuming, which may limit the number of times the black-box process may be run in a given time frame. The set of parameters may correspond to a multidimensional space (which may be referred to as the "parameter space"), where each set of parameter values may correspond to a point in the multidimensional space. A subset of parameters may define a "parameter surface" within the parameter space which is defined by the entire set of parameters. Tuning the parameters may require adequately sampling the parameter space or surface (depending on whether all or only a subset of parameters are optimized). However, for complex black-box processes which are computationally expensive and/or time consuming, it may be difficult or impractical to adequately sample the parameter space or surface within a reasonable timeframe and computational budget. Hereinafter, the term "parameter space" and "parameter surface" may be used interchangeably.

ML models may be used for complex black-box process parameter optimization. Even when using ML models, the parameter space may need to be limited to allow the ML model to train using an adequate number of samples in the parameter space. Exposing all parameters to an ML model may be computationally expensive and/or require long runtimes because the ML model may require many training iterations before the parameter space is sufficiently explored. Conversely, presenting too few parameters to the ML model may severely limit the degrees of optimization freedom that the ML model has at its disposal. Thus, although the smaller parameter space may be explored quickly, it may severely limit the amount of parameter optimization that the ML model is able to achieve.

There are many problems when manual approaches (which may employ heuristics, trial-and-error techniques, and/or intuition) are used to limit the parameter space that is presented to the ML model. First, it introduces human biases about what and how much to limit a set of parameters into the optimization process. A usual approach for a heuristic-based parameter limitation for a circuit optimization process is to limit the minimum/maximum size of an element depending on the use scenario of the circuit in question. For example, if the circuit is to be used in a low power scenario, the maximum size of transistors may be limited. This is done with an intuitive but biased belief that setting hard limits on peak power usage may reduce the average power usage. This belief may not be correct in all cases and this artificial limitation may limit the optimization freedom of the ML model. Second, the reduction of the parameter search space may limit or entirely exclude useful parameters while allowing in parameters that have little to no bearing on improving the output results, which may severely limit optimization efficiency. Third, it may not be possible to manually limit combinations of parameters. For example, if in a given black-box process, it is known that parameter value assignments "A=1" and "B=true" produces poor results, then it may not be easy to prevent the occurrence of this parameter value assignment during ML model training, which may waste computational resources when the black-box process runs using the bad parameter combination, returns a low fitness result, which then the ML model uses for training purposes (e.g., the ML model learns not to use that particular combination of parameter values again).

Embodiments described herein feature techniques and systems for using an ML model to optimize the set of parameters that drive a black-box function. Specifically, embodiments described herein feature techniques and systems for parameter filtering for ML black-box parameter optimization. Benefits of embodiments described herein include, but are not limited to, (1) automatically qualifying parameter space, and (2) improving runtimes for using the black-box function for its intended purpose by optimizing parameters (e.g., improving the runtime of an IC design tool by optimizing the IC design tool's parameters).

Some embodiments described herein use an interposer that, in terms of the software architecture, may be located between the ML model and the black-box process. The interposer may capture the goals that are desired to be achieved by the black-box function by using a series of filters that may quickly provide feedback to the ML model, which may enable the ML model to learn to avoid selecting parameter values that produce poor results.

Some embodiments described herein are described in the context of the black-box function being a transistor circuit optimization system. Generalizations to other black-box functions will be apparent to those skilled in the art. The transistor circuit optimization system takes as its input a textual (spice netlist format) representation of a circuit, a set of parameters, and user goals (e.g., a first upper bound threshold for the area and a second upper bound threshold for the power). In some embodiments described herein, the transistor circuit optimization system may use 40 parameters, where each parameter may have a value between 1-10. The parameter values may determine a "finger" count for each transistor. The parameter search space may include 218 distinct combinations of parameter values.

In other words, in this example, the black-box optimization function may be a transistor circuit optimization tool that accepts a netlist and produces an optimized netlist with metrics of area and power. The choice of the parameter values (which correspond to the finger count values) may determine the amount by which the power and area of the netlist are reduced. In situations where the parameter search space is large and the user goals are aggressive (e.g., the area and power thresholds are low), selecting parameter values randomly (e.g., when using a manual trial and error process) may be very unlikely to result in netlist metrics.

Figure 1:
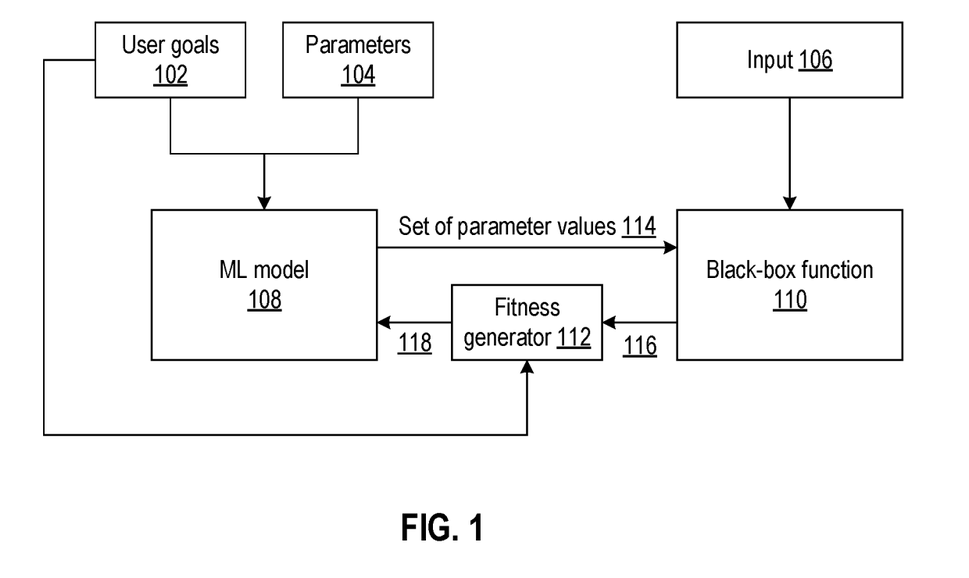
FIG. 1 illustrates ML-based parameter optimization of a black-box function in accordance with some embodiments described herein.

FIG. 1 illustrates ML-based parameter optimization of a black-box function in accordance with some embodiments described herein.

User goals 102 may specify metric values that are desired to be achieved, e.g., upper bounds on the area and power of a netlist. Parameters 104 may define the parameter space that is desired to be searched. ML model 108 may generate set of parameter values 114 based on user goals 102 and parameters 104. Next, multiple training iterations may be performed that include (1) ML model 108 generating set of parameter values 114 and providing set of parameter values 114 to black-box function 110, (2) using parameter values 114, black-box function generating output 116 based on input 106, and (3) fitness generator 112 generating fitness value(s) 118 based on output 116 and providing fitness value(s) 118 to ML model 108.

The type and form of input 106 that are provided to block-box function 110 may depend on black-box function 110. Set of parameter values 114 generated by ML model 108 may be referred to as a "proposal" because it is a set of parameter values which ML model 108 predicts (based on the current level of training) will result in output 116 with improved fitness value(s) 118. In this disclosure the terms "proposal" and "set of parameter values" may be used interchangeably.

Set of parameter values 114 may be received by black-box function 110, which may use the parameter values to modify one or more aspects of the black-box function 110. Thus, for the same input 106, black-box function 110 may generate a different output 116 for a different set of parameter values 114. Fitness generator 112 may compute fitness value(s) 118 based on one or more metrics of output 116. For example, input 106 may correspond to a netlist, output 116 may correspond to an optimized netlist, and fitness value(s) 118 may be generated based on one or more metrics (e.g., area and power) of the optimized netlist. Based on fitness value(s) 118, ML model 108 may generate new or additional proposals (which may correspond to new search areas in the parameter space) and the iterative loop may continue until an objective is met, the training time has expired, or negligible progress is being made.

In some embodiments described herein, the iterative training loop for ML model 108 may begin with ML model 108 in its initial state. In its initial state, ML model 108 may suggest exploratory proposals (i.e., set of parameter values) because in the beginning there may not be any basis or learning for ML model 108 to suggest an optimized set of parameter values. Thus, the initial proposals (e.g., set of parameter values 114) to black-box function 110 may correspond to randomly selected points in the parameter space, and as such the fitness value(s) 118 generated during the initial iterations may include bad fitness value(s) 118.

If the portion of the parameter surface that corresponds to good fitness value(s) 118 is very small in comparison to the portion of the parameter surface that corresponds to bad fitness value(s) 118, then it may require a significant number of exploratory proposal iterations for ML model 108 to find even a desired portion of a parameter surface let alone optimal or near optimal parameter values.

Figure 2:
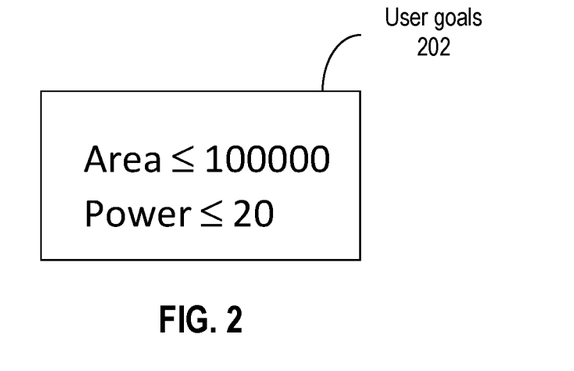
FIG. 2 illustrates an example of user goals in accordance with some embodiments described herein.

FIG. 2 illustrates an example of user goals in accordance with some embodiments described herein.

In general, the format of the goals and parameters may take any form. The example shown in FIG. 2 is for illustrative purposes and is not intended to limit the scope of the embodiments. As shown in FIG. 2, user goals 202 specify that the "area" metric is desired to be less than or equal to 100000 $nm^2$ and the "power" metric is desired to be less than or equal to 20 u W.

If the user has multiple goals, it may be even more difficult to train ML model 108 and may use even more training iterations to find the acceptable parameter surface. Specifically, if there are n goals and n−1 goals are satisfied but the nth goal is not satisfied, then the result may be determined as undesired. ML model 108 may use many iterations (e.g., thousands) to produce even acceptable results for one of the multiple user goals (e.g., the area goal in user goals 202) if the parameter search space is large. If a single run of black-box function 110 use a large amount of computation and/or runtime (e.g., 1 hour per run), then a significant amount of computation may be used up to provide barely acceptable results, let alone optimal or near optimal results.

It may be possible to reduce the computational effort by reducing the search space or relaxing the user goals. Reducing the search space may be problematic because the desirable portions of the search space (which may include optimal or near optimal parameter values) may be missed. Relaxing user goals may be problematic because even if the relaxed user goals are met, they are inherently suboptimal compared to the original user goals.

Figure 3:
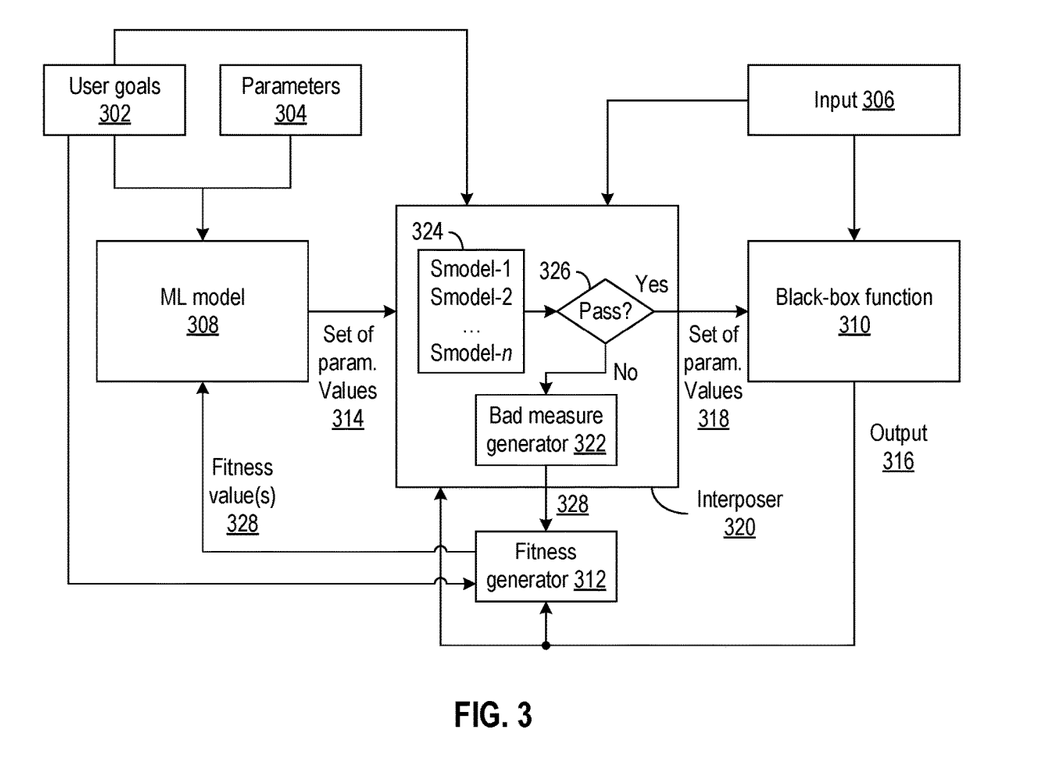
FIG. 3 illustrates an interposer system to help train an ML model in accordance with some embodiments described herein.

FIG. 3 illustrates an interposer system to help train an ML model in accordance with some embodiments described herein.

User goals 302 may specify metric values that are desired to be achieved, e.g., upper bounds on the area and/or power of a netlist. Parameters 304 may define the parameter space that is desired to be searched. The type and form of input 306 that are provided to block-box function 310 may depend on black-box function 310. Black-box function 310 may generate output 316 based on input 306 (where black-box function 310 may be configured based on a set of parameter values).

ML model 308 may generate a set of parameter values 314 based on user goals 302 and parameters 304. Interposer 320 may be inserted between ML model 308 and black-box function 310 so that the set of parameter values 314 may be received by interposer 320 instead of black-box function 310. Interposer 320 may also receive as input user goals 302 and input 306.

In some embodiments described herein, interposer 320 may use a set of ML models (e.g., surrogate models) 324 (which may also be referred to as gating filters) to evaluate the set of parameter values 314. Set of surrogate models 324, shown in FIG. 3 as "Smodel-1" through "Smodel-n," may execute much faster than the black-box function 310. Different sets of surrogate models may be used for different black-box functions and/or inputs.

The set of surrogate models 324 may approximate the relationship between input 306 and output 316 in a manner that enables the set of surrogate models 324 to quickly determine if the set of parameter values 314 are expected to generate undesirable results. In other words, the set of surrogate models 324 may approximate black-box function 310 in a manner that quickly enables an undesired set of parameter values to be rejected. For example, if certain parameter combinations are known to cause black-box function 310 to generate unviable or illegal results, then the set of surrogate models 324 may be used quickly detect such combinations and provide an appropriate training feedback to ML model 308.

In some embodiments described herein, a surrogate model in the set of surrogate models 324 may be a function that accepts as its input (1) input 306 which are presented to black-box function 310 and (2) user goals 302. The output of the surrogate model may be a "pass" or "fail" result. Interposer 320 may check the output of set of surrogate models 324 (at 326). If the set of surrogate models 324 generates a pass result ("Yes" branch emanating from 326), then interposer 320 may provide the set of parameter values 318 (which may be the same as the set of parameter values 314) to black-box function 310. On the other hand, if the set of surrogate models 324 generates a fail result ("No" branch emanating from 326), then interposer 324 may invoke bad measure generator 322.

Figure 4:
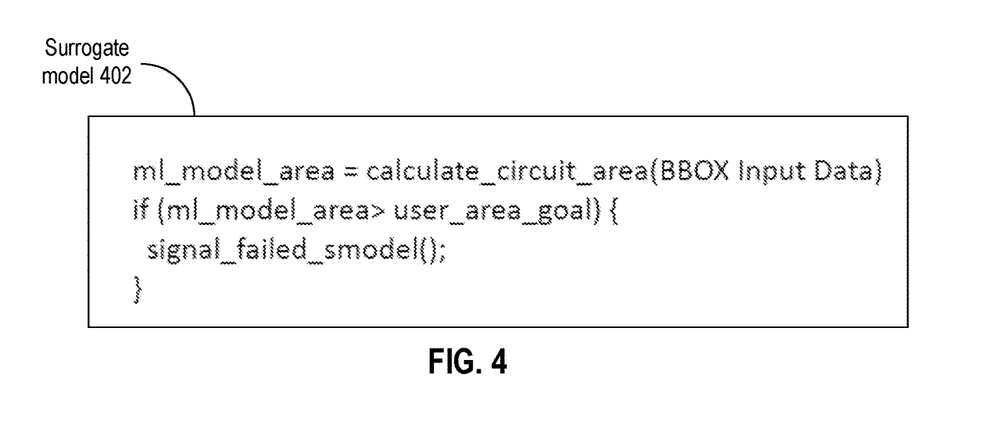
FIG. 4 illustrates an example of a surrogate model in accordance with some embodiments described herein.

FIG. 4 illustrates an example of a surrogate model in accordance with some embodiments described herein.

Surrogate model 402 may be a surrogate model in set of surrogate models 324. The pseudo-code of surrogate model 402 quickly calculates the area of a circuit based on the set of parameter values 314 and input 306. Next, surrogate model 402 compares the calculated area with user goals 302. If the calculated area exceeds an area threshold specified in user goals 302, then surrogate model 402 generates a "fail" result. Surrogate model 402 may save the result of area calculation for use by a bad measure generator (e.g., bad measure generator 322).

In general, a surrogate model may harvest output 316 of black-box function 310, which may include, but is not limited to, primary output files (e.g., optimized netlist), logfiles, metric values (e.g., area and power of the optimized netlist), or diagnostic reports. For example, a surrogate model may monitor a logfile generated by black-box function 310 for diagnostic information that indicates an error condition. If an error condition is detected, then run can be terminated, and bad measure generator 322 may be invoked.

In some embodiments described herein, set of surrogate models 324 may implement a "high speed" or "low accuracy" or "light" version of black-box function 310 that performs a limited but sufficiently accurate computation. For example, it may be possible to convert an accurate but computationally expensive black-box function 310 to a fast but low accuracy variant. The fast version may be used as set of surrogate models 324.

In a first example, the parameters may be a set of dimensions for polygons in the physical layout of a circuit (e.g., input 306), and black-box function 310 may perform a simulation of the electrical circuit behavior. User goals 302 may include electrical properties of the circuit (e.g., input 306) which must be met. The electrical properties may be outputted (e.g., output 316) by the simulation (e.g., black-box function 310). Since the parameters correspond to physical aspects of the circuit, but are unrestricted in their variability, aside from setting a min/max range on a per-parameter basis, there is no validation that parameter combinations are physically valid with respect to the foundry physical design rules (this is because black-box function 310 may only simulate the electrical properties and may not have any insight into the physical modeling).

In this example, the layout of the circuit (e.g., input 306) may be designed in such a way that the foundry design rules (which may be included in user goals 302) would disallow combinations of parameter values, and thus some black-box function 310 evaluations of parameter value combinations could be invalid and a waste of resources. A foundry design rule may place constraints on the dimensions of polygons and spacing between polygons to ensure that the layout of the circuit can be reliably manufactured by a semiconductor fabrication process used by the foundry. Specifically, the percentage of the parameter space that could be invalid may be quite large. In this example, set of surrogate models 324 may use the foundry rule checker (or an approximation of the foundry rule checker) to validate the parameter value combinations before black-box function 310 is executed on input 306. Thus, in this example, set of surrogate models 324 may quickly filter out parameter value combinations that violate foundry rule checks, which may avoid wasteful computation in which black-box function 310 generates results that are very likely or guaranteed to fail user goals 302 (e.g., the goal of satisfying foundry rule checks).

In a second example, the parameters may be alternate topologies for portions of a circuit (e.g., input 306), and black-box function 310 may compute performance characteristics of the entire circuit (e.g., power consumption, circuit delay/frequency, cumulative gate sizes, interconnect density, etc.). The impact of different topologies for individual parameterized portions and for the whole circuit can result in unintended changes to the functionality of the circuit as a whole. Black-box function 310 may not have the ability to validate functionality. In this example, set of surrogate models 324 may evaluate the functional correctness of the circuit design against a specification (e.g., by using a set of assertions) or by comparing the functioning of the circuit with the functioning of a reference circuit (which is known to be functionally correct), or any other means to efficiently detect unintended functional changes. Thus, in this example, set of surrogate models 324 may quickly filter out parameter values (e.g., topologies) that cause unintended changes to circuit functionality, which may avoid wasteful computation in which black-box function 310 generates results that are very likely or guaranteed to fail user goals 302 (i.e., the goal of not changing the functionality of the circuit).

Figure 5:
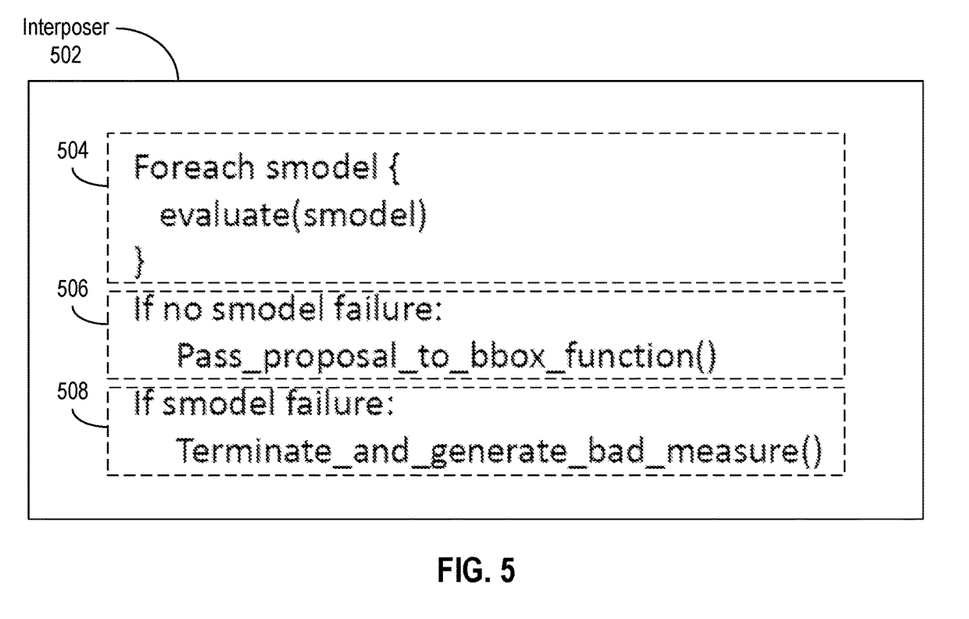
FIG. 5 illustrates an example of an interposer in accordance with some embodiments described herein.

FIG. 5 illustrates an example of an interposer in accordance with some embodiments described herein.

Interposer 502 (which may correspond to interposer 320 in FIG. 3) may evaluate each surrogate model in a set of surrogate models (pseudocode 504). If no surrogate model fails (pseudocode 506), then the set of parameter values (e.g., the set of parameter values 314) may be passed to the black-box function (e.g., the set of parameter values 318 passed to black-box function 310, where the set of parameter values 318 may be the same as the set of parameter values 314). On the other hand, a failure result from a single surrogate model function may trigger invocation of the bad measure generator (pseudocode 508). Pseudocodes 506 and 508 may correspond to checking the surrogate model results (at 326) shown in FIG. 3.

Figure 6:
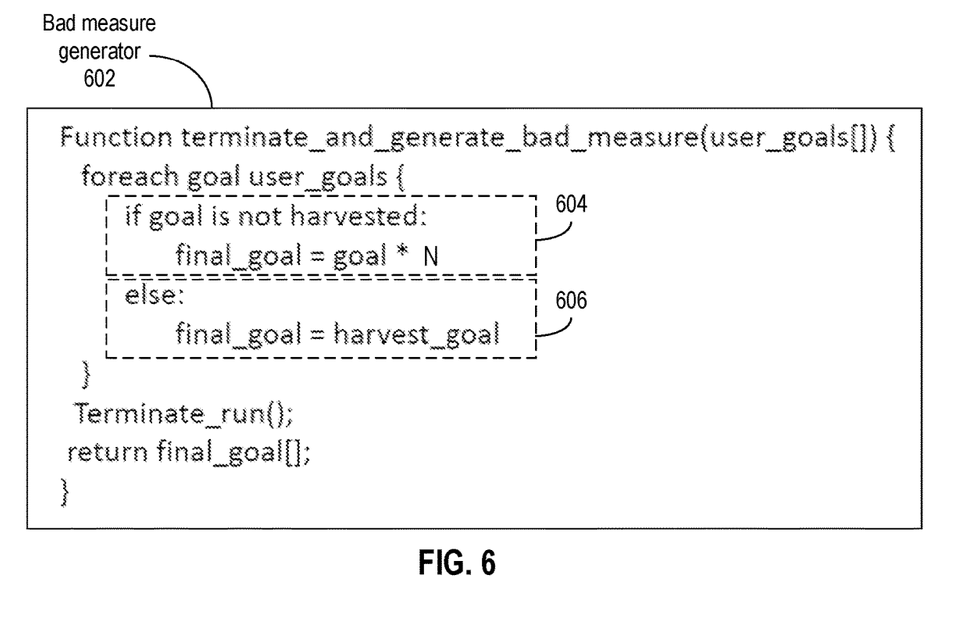
FIG. 6 illustrates an example of a bad measure generator in accordance with some embodiments described herein.

FIG. 6 illustrates an example of a bad measure generator in accordance with some embodiments described herein.

When a surrogate model fails, data corresponding to all user goals may not be available. For example, if surrogate model 402 shown in FIG. 4 generates a fail result, then an area value may be available, but a power value may not be available. Bad measure generator 602 (which may correspond to bad measure generator 322) may be used to generate a power value that may be provided to a fitness generator (e.g., fitness generator 312).

In some embodiments described herein, bad measure generator 602 may multiply a user goal value by a factor (e.g., N in pseudocode 604 in FIG. 6) if the value is not available. The factor may be specified by a user. For example, if a user goal (e.g., power) is desired to be minimized, then bad measure generator 602 may provide a power value that is twice the user goal (i.e., N=2) when the power value is not available. On the other hand, if a user goal is being maximized, then bad measure generator 602 may provide a power value that is half the user goal (i.e., N=0.5). In general, bad measure generator 602 may use any penalty function to calculate a measure value based on the user goals that indicates to the ML model (e.g., ML model 308) that the user goals (e.g., user goals 302) were not met.

Figure 7:
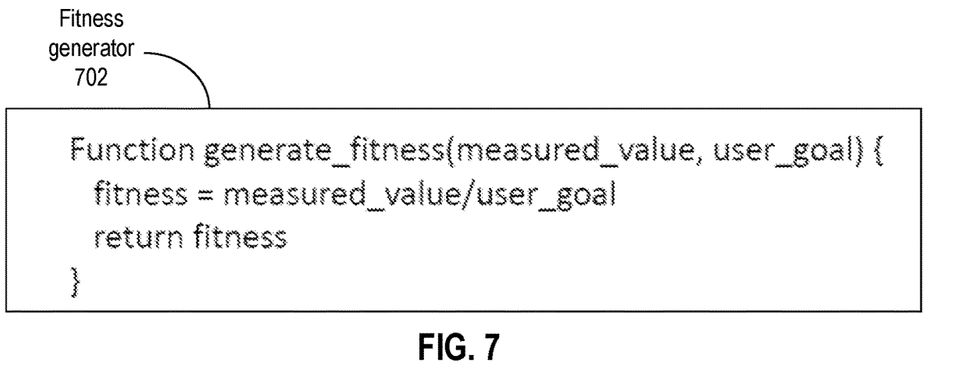
FIG. 7 illustrates a fitness generator in accordance with some embodiments described herein.

FIG. 7 illustrates a fitness generator in accordance with some embodiments described herein.

The output (e.g., output 328) generated by a bad measure generator (e.g., bad measure generator 322) may be provided to a fitness generator (e.g., fitness generator 312). Fitness generator 702 generate a fitness value that is equal to a ratio of the measured value to the user goal. Specifically, in the example shown in FIG. 7, a fitness value greater than 1 indicates that the measured value is worse than user goal, and a fitness value of less than 1 indicates that the measured value is better than user goal. In general, different ML models may accept different types and scales of fitness values. Examples of fitness values include, but are not limited to, true/false values, numerical values, logarithmic values, and exponential values. A fitness generator (e.g., fitness generator 702 or 322) may generate a value that is understood by the ML model (e.g., ML model 308).

In some embodiments described herein, set of surrogate models 324 may consume the same set of parameters as black-box function 310 and generate the same type of output that is fed into fitness generator 312. In some embodiments described herein, different surrogate models in the set of surrogate models 324 may each consume a subset of the parameters. In some embodiments described herein, the results of the set of surrogate models 324 may be aggregated to generate an aggregate output that corresponds to the output generated by black-box function 310. The set of surrogate models 324 may have a low false negative rate ("negative" as defined by the threshold filter described below). In some embodiments described herein, the set of surrogate models 324 may be designed, tested, and correlated based on black-box function 310. In other words, set of surrogate models 324 may be specific to black-box function 310, and different sets of surrogate models may be used for different black-box functions.

When ML model 308 generates the set of parameter values 314 (which are for use by black-box function 310), they may be provided to interposer 320 for evaluation. The set of surrogate models 324 in interposer 320 may generate a set of scores (or set of output values), which may be compared against a set of success thresholds. Any score failing the corresponding success threshold may be passed back to ML model 308 with a penalized score (e.g., bad measure generator 322 may multiply the score in the non-preferred direction by a constant factor, e.g., N in pseudocode 604). ML model 308 may also be notified whether the result was generated by interposer 320 or black-box function 310.

On the other hand, if the set of scores pass the set of success thresholds, then the set of parameter values 314 may be provided (e.g., the set of parameter values 318 in FIG. 3) to black-box model 310 for full (resource-intensive) evaluation. In other words, the set of success thresholds may act as a gating function that determines whether a set of parameter values is good enough to expend computational resources for the full black-box function evaluation.

When black-box function 310 completes a full evaluation, its output (e.g., output 316) may be provided to fitness generator 312 to generate fitness value 328. Additionally, output 316 may also be provided to ML model 308 (not shown in FIG. 3) to provide additional context.

As an example, black-box function 310 may be a circuit optimization system. The parameters optimized may be the transistor characteristics such as "finger counts" on a set of transistors (e.g., a set of 40 transistors). In this example, the finger counts could vary from 1-20 on each transistor, which may lead to a search space well over 218 possible combinations. In this example, black-box function 310 may be computationally expensive, e.g., each run may perform computations on 40 central processing unit (CPU) cores for 90 minutes to complete. In this example, if an interposer system were not used, then in a given 24 hour period, only 15 complete runs of black-box 310 may be performed. Fifteen iterations per day may be inadequate for training an ML model 308.

In a first experiment, ML model 308 was trained without using the interposer system. Experimental results indicated that ML model 308 training did not complete after many days of computation. Also, for comparison purposes, manual parameter tuning efforts were attempted where the parameter space was tuned by changing finger count ranges across the optimizable settings. A worsening of results was recorded as it turned out to be infeasible to manually tune such a large parameter space.

Next, in a second experiment, interposer 320 was used. In this experiment, interposer 320 was written in the C++ programming language and used an area calculation surrogate model that performed area calculations much faster than using black-box function 310. Interposer 320 was used to penalize ML model 308 for exceeding area targets (specified in user goals 302). Given the large size of the parameter space, training ML model 308 required over 1000 iterations to generate good area proposals. By use of interposer 320, over 1000 iterations were completed in minutes because interposer 320 provided fitness feedback for each iteration in milliseconds. As a comparison, 1000 training iterations without interposer 320 would have taken many weeks of computation. In other words, using interposer 320 to train ML model 308, and then using ML model 308 to generate parameters for black-box function 310, significantly improved the quality of results produced by black-box function 310.

Figure 8:
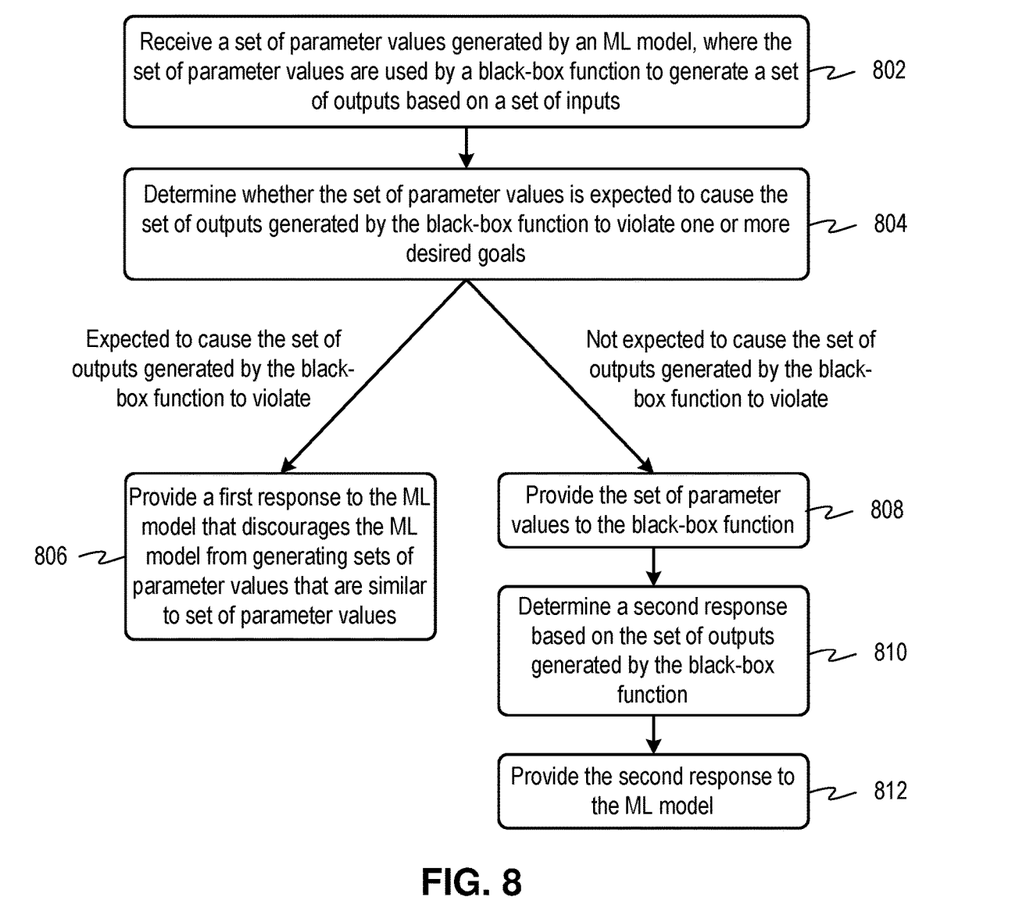
FIG. 8 illustrates a process for training an ML model to provide a set of parameter values to a black-box function in accordance with some embodiments described herein.

FIG. 8 illustrates a process for training an ML model to provide a set of parameter values to a black-box function in accordance with some embodiments described herein.

A set of parameter values generated by an ML model may be received, where the set of parameter values are used by a black-box function to generate a set of outputs based on a set of inputs (at 802). For example, in FIG. 3, interposer 320 may receive the set of parameter values 314 from ML model 308. Next, it may be determined whether the set of parameter values is expected to cause the set of outputs generated by the black-box function to violate one or more desired goals (at 804). For example, in FIG. 3, set of surrogate model functions 324 may be used to determine whether the set of parameter values 314 is expected to cause output 316 generated by black-box function 310 to violate one or more user goals 302.

If the set of parameter values is expected to cause the set of outputs generated by the black-box function to violate the one or more desired goals, then a first response to the ML model may be provided that discourages the ML model from generating sets of parameter values that are similar to the set of parameter values (at 806). For example, in FIG. 3, the "No" branch emanating from check 326 may cause bad measure generator 322 to generate output 328, which may cause fitness generator 312 to generate fitness value(s) 328. Fitness value(s) 328 may be provided to ML model 308, which discourages ML model 308 from generating parameter values that are similar to the set of parameter values 314. Specifically, ML model 308 may be discouraged if fitness value(s) 328 are greater than a threshold for goals that are being minimized, and less than a threshold for goals that are being maximized. A first set of parameter values may be similar to a second set of parameter values if a distance metric (e.g., multidimensional Euclidean distance) between the two sets of parameters values is less than a threshold.

On the other hand, if the set of parameter values is not expected to cause the set of outputs generated by the black-box function to violate the one or more desired goals, then the set of parameter values may be provided to the black-box function (at 808), a second response may be determined based on the set of outputs generated by the black-box function (at 810), and the second response may be provided to the ML model (at 812). For example, in FIG. 3, the "Yes" branch emanating from check 326 may provide the set of parameter values 318 (which may be the same as the set of parameter values 314) to black-box function 310, and output 316 generated by black-box function 310 may be used by fitness generator 312 to generate and provide fitness value(s) 328 to ML model 308. ML model 308 may use fitness value(s) 328 to learn how to generate the set of parameter values 314 which result in output 316 that meets user goals 302.

Figure 9:
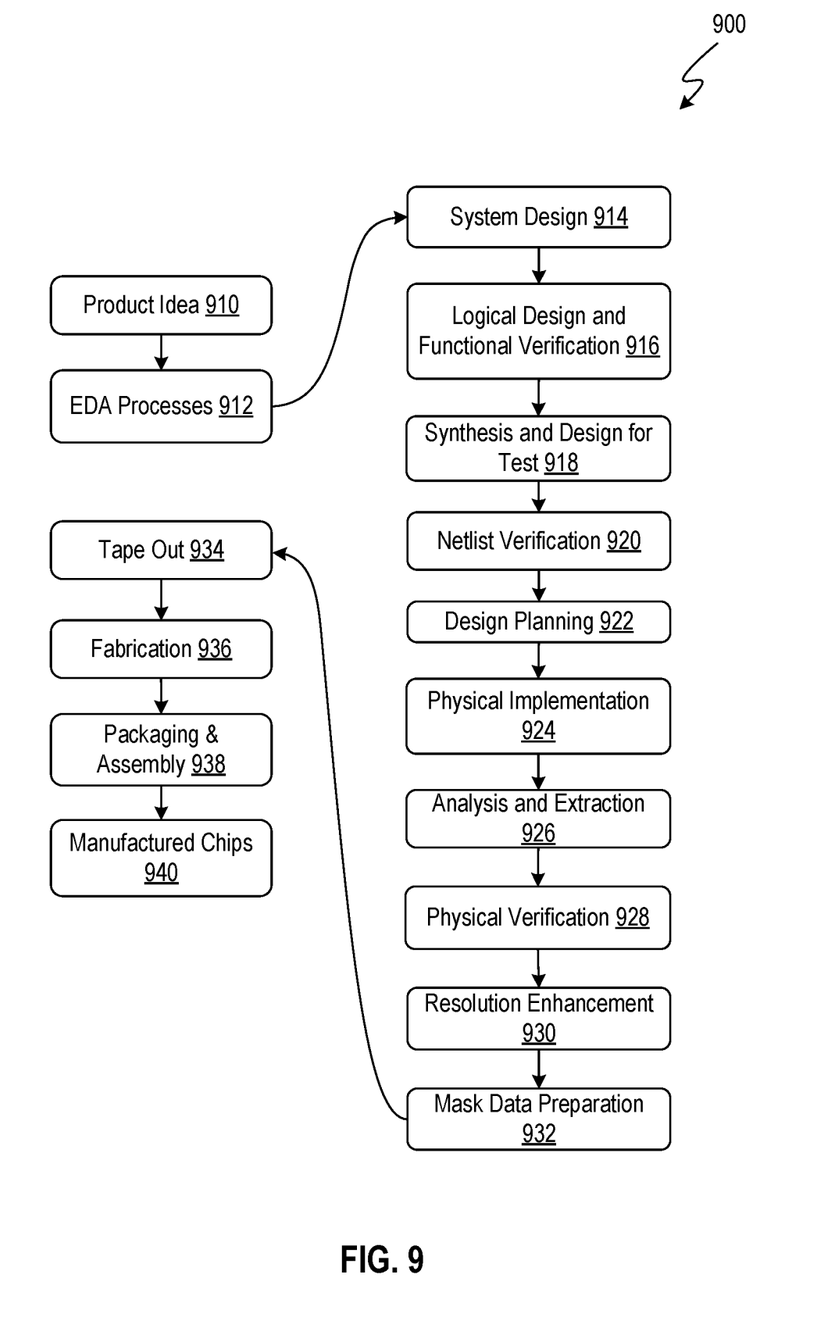
FIG. 9 illustrates an example flow for the design, verification, and fabrication of an integrated circuit in accordance with some embodiments described herein.

FIG. 9 illustrates an example flow for the design, verification, and fabrication of an integrated circuit in accordance with some embodiments described herein.

EDA processes 912 (the acronym "EDA" refers to "Electronic Design Automation") can be used to transform and verify design data and instructions that represent the integrated circuit. Each of these processes can be structured and enabled as multiple modules or operations. Black-box function 310 in FIG. 3 may correspond to one or more of EDA processes 912.

Flow 900 can start with the creation of a product idea 910 with information supplied by a designer, information which is transformed and verified by using EDA processes 912. When the design is finalized, the design is taped-out 934, which is when artwork (e.g., geometric patterns) for the integrated circuit is sent to a fabrication facility to manufacture the mask set, which is then used to manufacture the integrated circuit. After tape-out, a semiconductor die is fabricated 936 and packaging and assembly 938 are performed to produce the manufactured IC chip 940.

Specifications for a circuit or electronic structure may range from low-level transistor material layouts to high-level description languages. A high-level of representation may be used to design circuits and systems, using a hardware description language ("HDL") such as VHDL, Verilog, System Verilog, SystemC, MyHDL or Open Vera. The HDL description can be transformed to a logic-level register transfer level ("RTL") description, a gate-level description, a layout-level description, or a mask-level description. Each lower representation level that is a more detailed description adds more detail into the design description. The lower levels of representation that are more detailed descriptions can be generated by a computer, derived from a design library, or created by another design automation process. An example of a specification language at a lower level of representation language for specifying more detailed descriptions is SPICE (which stands for "Simulation Program with Integrated Circuit Emphasis"). Descriptions at each level of representation contain details that are sufficient for use by the corresponding tools of that layer (e.g., a formal verification tool).

During system design 914, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 916, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as test-bench generators, static HDL checkers, and formal verifiers. In some embodiments, special systems of components referred to as 'emulators' or 'prototyping systems' are used to speed up the functional verification.

During synthesis and design for test 918, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 920, the netlist is checked for compliance with timing constraints and for correspondence with the HDL code. During design planning 922, an overall floor plan for the integrated circuit is constructed and analyzed for timing and top-level routing.

During layout or physical implementation 924, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flip-flop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 926, the circuit function is verified at the layout level, which permits refinement of the layout design. During physical verification 928, the layout design is checked to ensure that manufacturing constraints are correct, such as DRC constraints, electrical constraints, lithographic constraints, and that circuitry function matches the HDL design specification. During resolution enhancement 930, the geometry of the layout is transformed to improve how the circuit design is manufactured.

During tape-out, data is created to be used (after lithographic enhancements are applied if appropriate) for production of lithography masks.

During mask data preparation 932, the 'tape-out' data is used to produce lithography masks that are used to produce finished integrated circuits.

A storage subsystem of a computer system (such as computer system 1000 in FIG. 10) may be used to store the programs and data structures that are used by some or all of the EDA products described herein, and products used for development of cells for the library and for physical and logical design that use the library.

Figure 10:
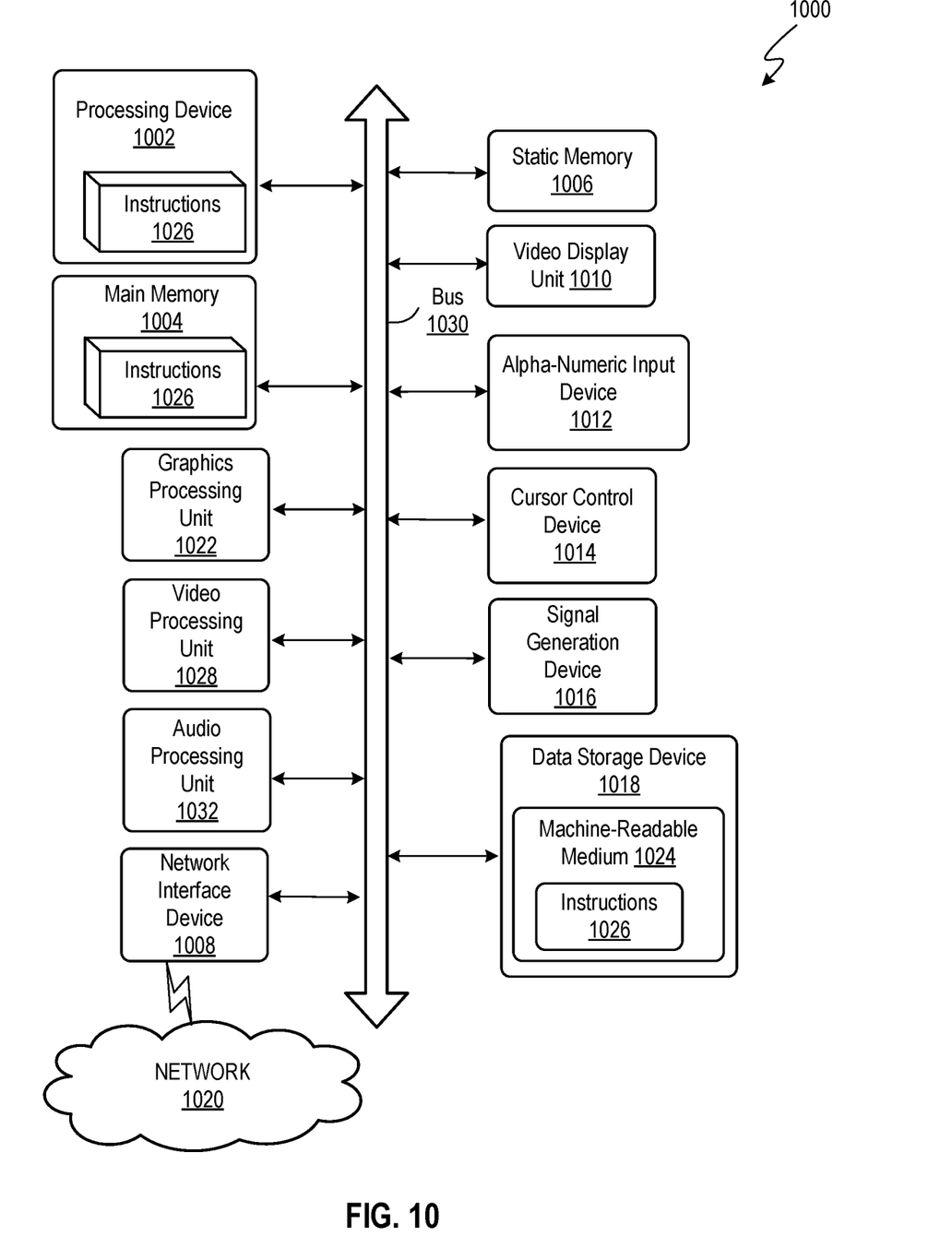
FIG. 10 illustrates an example machine of a computer system within which a set of instructions, for causing the machine to perform any one or more of the methodologies discussed herein, may be executed.

FIG. 10 illustrates an example machine of a computer system 1000 within which a set of instructions, for causing the machine to perform any one or more of the methodologies discussed herein, may be executed.

In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM), a static memory 1006 (e.g., flash memory, static random access memory (SRAM), etc.), and a data storage device 1018, which communicate with each other via a bus 1030.

Processing device 1002 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may be configured to execute instructions 1026 for performing the operations and steps described herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a non-transitory computer-readable medium) on which is stored one or more sets of instructions 1026 or software embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In some implementations, the instructions 1026 include instructions to implement functionality corresponding to the present disclosure. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1002 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various design modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
    receiving a set of parameter values generated by a machine learning (ML) model, wherein the set of parameter values are used by a black-box function to generate a set of outputs based on a set of inputs;
    determining whether the set of parameter values is expected to cause the set of outputs generated by the black-box function to violate one or more desired goals, wherein determining whether the set of parameter values is expected to cause the set of outputs generated by the black-box function to violate the one or more desired goals comprises evaluating one or more surrogate models based on the set of inputs and the one or more desired goals; and
    in response to determining, by a processor, that the set of parameter values is expected to cause the set of outputs generated by the black-box function to violate the one or more desired goals, providing a first response to the ML model that discourages the ML model from generating sets of parameter values that are similar to the set of parameter values.

2. The method of claim 1, further comprising:
    in response to determining that the set of parameter values is not expected to cause the set of outputs generated by the black-box function to violate the one or more desired goals,
        providing the set of parameter values to the black-box function,
        determining a second response based on the set of outputs generated by the black-box function, and
        providing the second response to the ML model.

3. The method of claim 1, wherein the first response to the ML model that discourages the ML model from generating the sets of parameter values that are similar to the set of parameter values comprises a fitness value that is greater than a first threshold for desired goals that are minimized or less than a second threshold for desired goals that are maximized, and wherein two sets of parameter values are similar if a distance metric between the two sets of parameter values is less than a third threshold.

4. The method of claim 1, wherein the set of inputs includes a circuit design.

5. The method of claim 4, wherein a surrogate model in the one or more surrogate models determines if the circuit design violates a foundry design rule.

6. The method of claim 4, wherein a surrogate model in the one or more surrogate models determines if the circuit design satisfies a set of assertions.

7. The method of claim 4, wherein the one or more desired goals includes ensuring that an area of the circuit design is less than or equal to an area threshold.

8. The method of claim 4, wherein the one or more desired goals includes ensuring that a power consumption of the circuit design is less than or equal to a power consumption threshold.

9. A non-transitory computer-readable medium comprising stored instructions, which when executed by a processor, cause the processor to
    receive a set of parameter values generated by a machine learning (ML) model, wherein the set of parameter values are used by a black-box function to generate a set of outputs based on a set of inputs;
    determine whether the set of parameter values is expected to cause the set of outputs generated by the black-box function to violate one or more desired goals, wherein determining whether the set of parameter values is expected to cause the set of outputs generated by the black-box function to violate the one or more desired goals comprises evaluating one or more surrogate models based on the set of inputs and the one or more desired goals;
    in response to determining that the set of parameter values is expected to cause the set of outputs generated by the black-box function to violate the one or more desired goals, provide a first response to the ML model that discourages the ML model from generating sets of parameter values that are similar to the set of parameter values; and
    in response to determining that the set of parameter values is not expected to cause the set of outputs generated by the black-box function to violate the one or more desired goals,
        provide the set of parameter values to the black-box function,
        determine a second response based on the set of outputs generated by the black-box function, and
        provide the second response to the ML model.

10. The non-transitory computer-readable medium of claim 9, wherein the first response to the ML model that discourages the ML model from generating the sets of parameter values that are similar to the set of parameter values comprises a fitness value that is greater than a first threshold for desired goals that are minimized or less than a second threshold for desired goals that are maximized, and wherein two sets of parameter values are similar if a distance metric between the two sets of parameter values is less than a third threshold.

11. The non-transitory computer-readable medium of claim 9, wherein the set of inputs includes a circuit design.

12. The non-transitory computer-readable medium of claim 11, wherein a surrogate model in the one or more surrogate models determines if the circuit design violates a foundry design rule.

13. The non-transitory computer-readable medium of claim 11, wherein a surrogate model in the one or more surrogate models determines if the circuit design satisfies a set of assertions.

14. The non-transitory computer-readable medium of claim 11, wherein the one or more desired goals includes ensuring that an area of the circuit design is less than or equal to an area threshold.

15. The non-transitory computer-readable medium of claim 11, wherein the one or more desired goals includes ensuring that a power consumption of the circuit design is less than or equal to a power consumption threshold.

16. An apparatus, comprising:
a memory storing instructions; and
a processor, coupled with the memory and to execute the instructions, the instructions when executed causing the processor to:
receive a set of parameter values generated by a machine learning (ML) model, wherein the set of parameter values are used by an electronic design automation (EDA) tool to generate a second circuit design based on a first circuit design;
determine whether the set of parameter values is expected to cause the second circuit design generated by the EDA tool to violate one or more desired goals;
in response to determining that the set of parameter values is expected to cause the second circuit generated by the EDA tool to violate the one or more desired goals, provide a first response to the ML model that discourages the ML model from generating sets of parameter values that are similar to the set of parameter values; and
in response to determining that the set of parameter values is not expected to cause the second circuit design generated by the EDA tool to violate the one or more desired goals,
provide the set of parameter values to the EDA tool,
determine a second response based on the second circuit design generated by the EDA tool, and
provide the second response to the ML model.

17. The apparatus of claim 16, wherein the first response to the ML model that discourages the ML model from generating the sets of parameter values that are similar to the set of parameter values comprises a fitness value that is greater than a first threshold for desired goals that are minimized or less than a second threshold for desired goals that are maximized, and wherein two sets of parameter values are similar if a distance metric between the two sets of parameter values is less than a third threshold.

18. The apparatus of claim 16, wherein the determining whether the set of parameter values is expected to cause the second circuit design generated by the EDA tool to violate the one or more desired goals comprises evaluating one or more surrogate models based on the first circuit design and the one or more desired goals.

19. The apparatus of claim 16, wherein a first goal in the one or more desired goals ensures that an area of the first circuit design is less than or equal to an area threshold, and wherein a second goal in the one or more desired goals ensures that a power consumption of the first circuit design is less than or equal to a power consumption threshold.

\* \* \* \* \*